(No Model.)  3 Sheets—Sheet 2.
J. H. CAFFREY.
SLEIGH.
No. 579,917.  Patented Mar. 30, 1897.
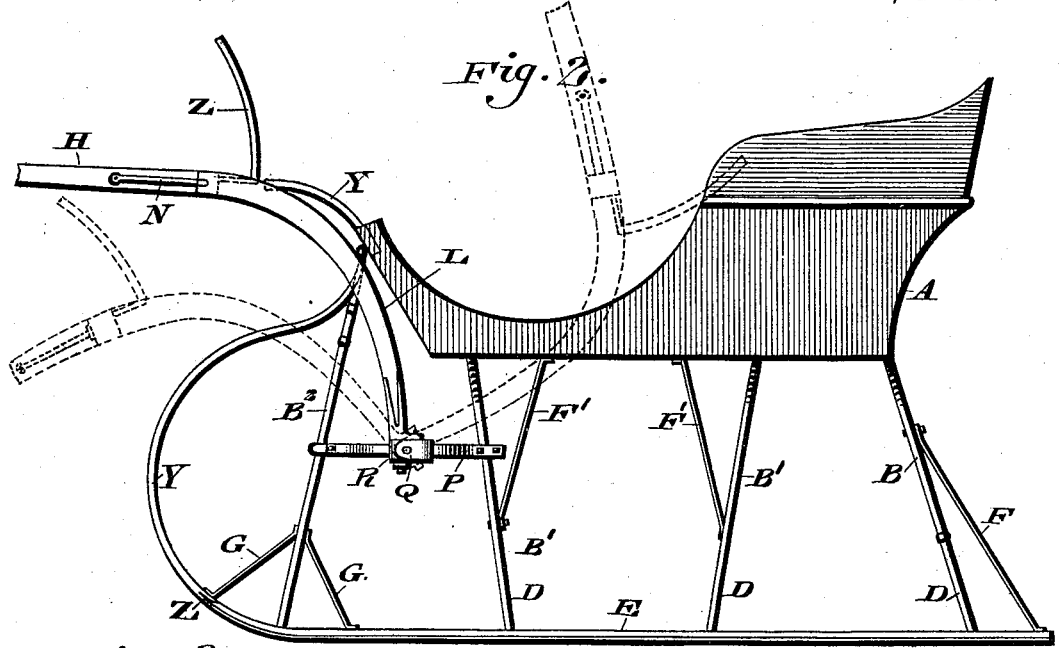
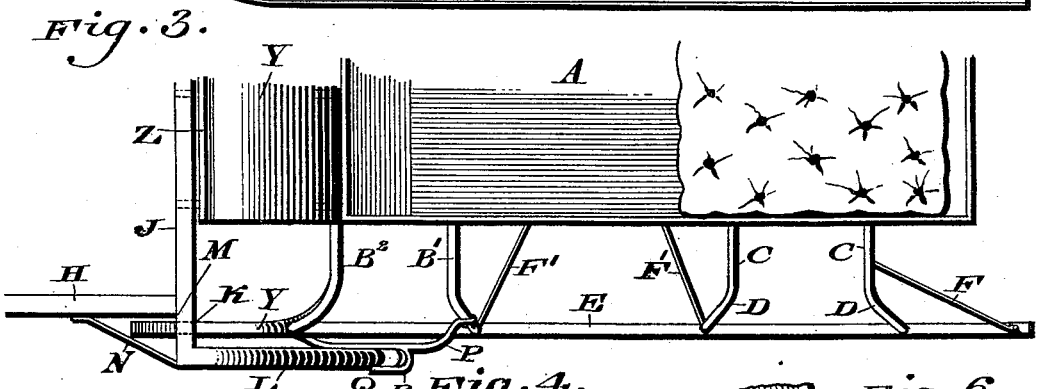
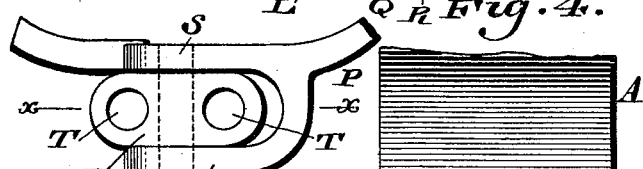
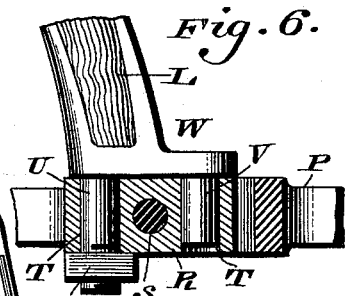
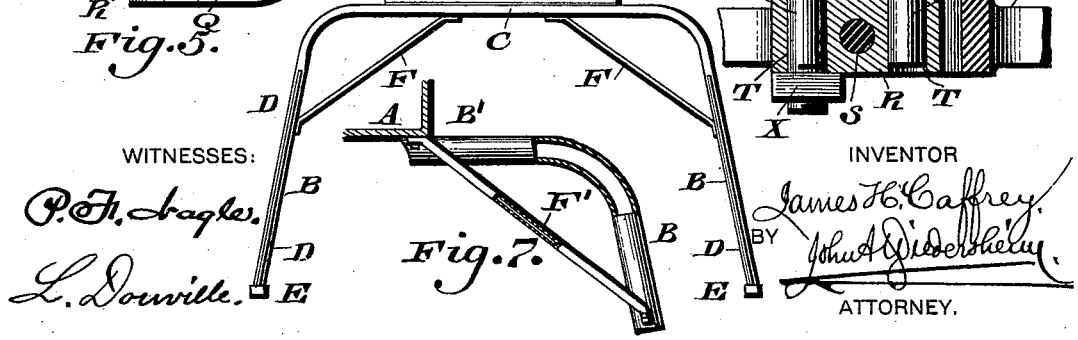
WITNESSES:
P. H. Eagles.
L. Douville.
INVENTOR
James H. Caffrey.
BY John A. Wiedersheim
ATTORNEY.

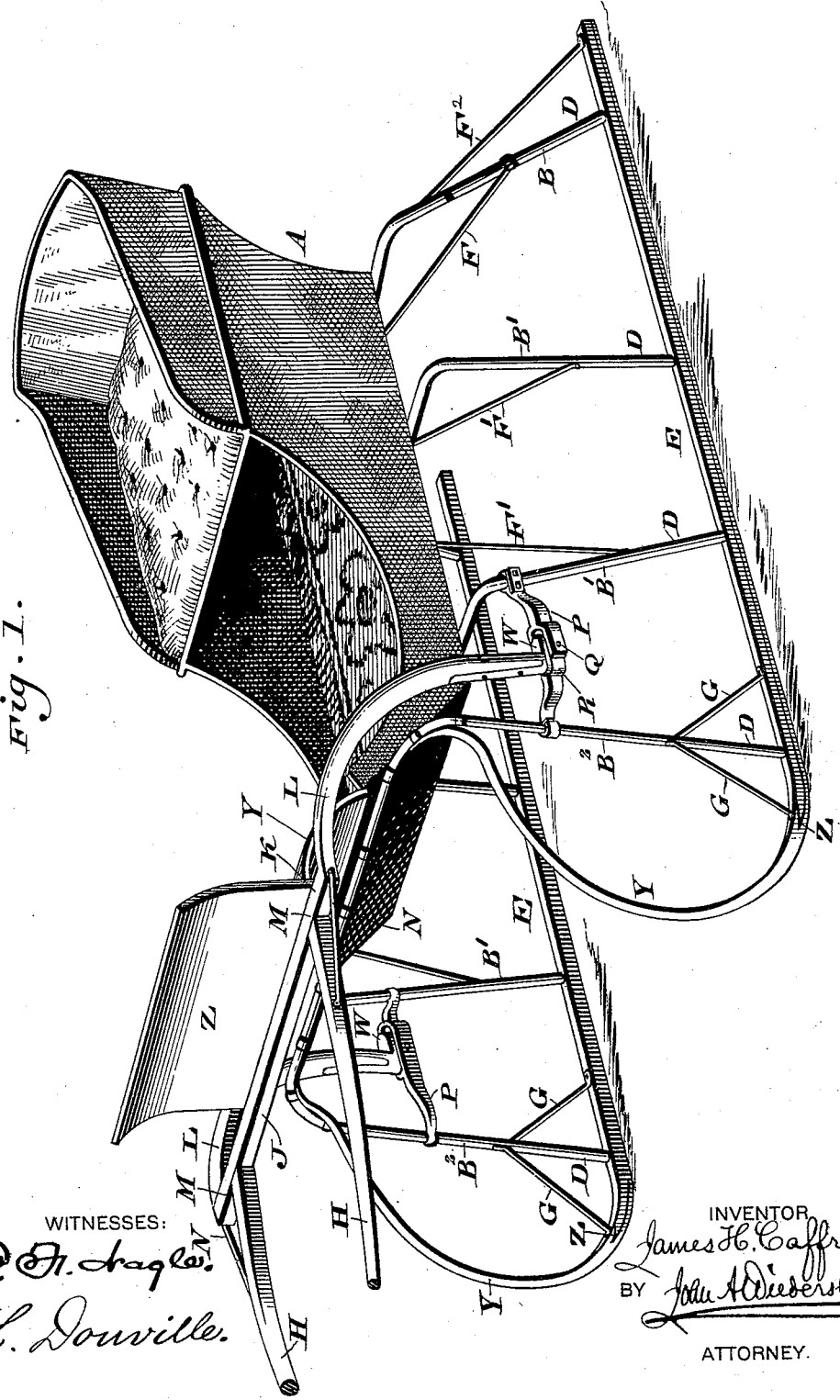

(No Model.) 3 Sheets—Sheet 3.
J. H. CAFFREY.
SLEIGH.
No. 579,917. Patented Mar. 30, 1897.
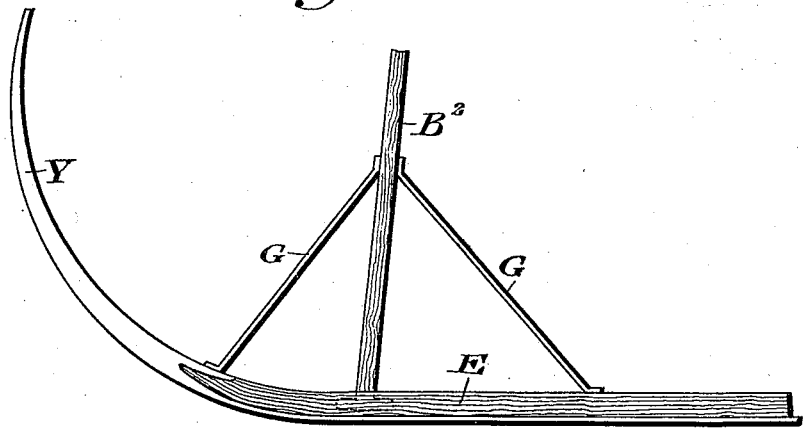
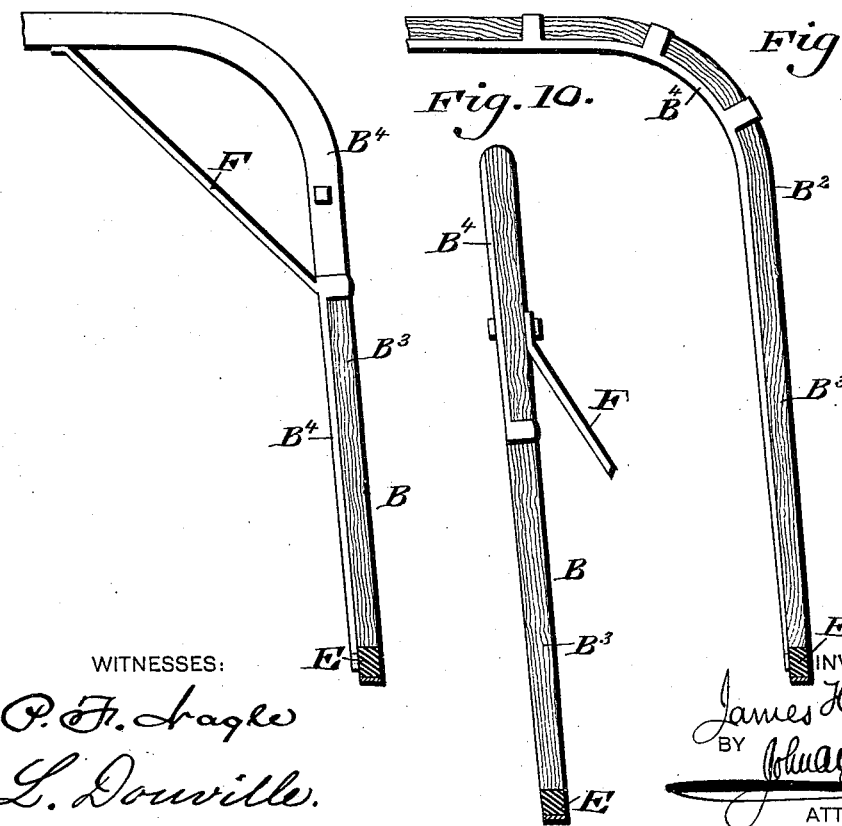
WITNESSES:
INVENTOR
James H. Caffrey.
BY
ATTORNEY.

UNITED STATES PATENT OFFICE.

JAMES H. CAFFREY, OF PHILADELPHIA, PENNSYLVANIA.

SLEIGH.

SPECIFICATION forming part of Letters Patent No. 579,917, dated March 30, 1897.

Application filed November 25, 1895. Serial No. 570,009. (No model.)

*To all whom it may concern:*

Be it known that I, JAMES H. CAFFREY, a citizen of the United States, residing in the city and county of Philadelphia, Pennsylvania, have invented new and useful Improvements in Sleighs, which improvements are fully set forth in the following specification and accompanying drawings.

My invention relates to improvements in a sleigh; and it consists in providing a sleigh with benches having diverging branches and a step which couples adjacent benches and provided with means for coupling the shafts or tongue of the sleigh to said benches.

It also consists in providing the step with a rocking seat to which the shaft or thill coupling may be coupled.

It further consists in providing the shafts with a screen, fender, or dashboard which, with another screen, fender, or dashboard fastened upon the front of the body of the sleigh, are so shaped, so combined, and arranged that together they shall form a continuity of protecting-surface, both screens rising from their respective parts and meeting to form a disconnected angle one with the other.

It also further consists in the combination and arrangement of parts hereinafter set forth and claimed.

Figure 1 represents a perspective view of a sleigh embodying my invention. Fig. 2 represents a side elevation thereof. Fig. 3 represents a top or plan view of a portion thereof. Fig. 4 represents a rear view of a portion thereof. Fig. 5 represents a top or plan view of a portion of the coupling. Fig. 6 represents a vertical section thereof. Fig. 7 represents a section of a portion of one of the benches. Figs. 8, 9, 10, and 11 represent side elevations of detached portions.

Similar letters of reference indicate corresponding parts in the several figures.

Referring to the drawings, A designates the body of the sleigh, the same being supported on the arch-like benches B B', whose crowns C are attached to said body and whose legs D are flaring and secured to the runners E, the benches B' having steel-tube braces F' suitably connected with them and with said body, the bench B² having steel-tube braces G suitably connected with the same and with the runners. The bench B has metallic braces F F² connected with the same, the body, and runners.

It will be noticed that as the braces F F' F² are connected with the benches and the body of the sleigh and the braces diverge from said braces to said body great strength of support of the body is attained, and the spaces between the side limbs of the benches are not obstructed by said braces, as would be the case were the upper ends of said braces attached to the crowns of the benches.

H designates the forward portion of the shafts of the sleigh, the same being connected with the cross-bar J, whose ends are set out or extended outwardly beyond said forward parts H of shafts, as at K, the ends of the extended portions having secured to them the curved rear terminals L of said shafts, it being seen that the extensions K of the bar J and the rear ends L of the shafts form angles M, to whose limbs are secured the diagonal or oblique braces or guards N, it being also seen that said braces extend from the front ends of the rear portions L of the shafts to the sides of the portions H of the shafts and that the fronts of the runners E are within the terminals L of the shafts, so that should the sleigh collide with any object the guard or brace N will receive the blow of contact, which will deflect it and cause the sleigh to shear off, thus forming a protection to the entire sleigh, as will be apparent on reference to Fig. 3.

P designates the steps of the sleigh, the same consisting of bars which are secured by clips, bolts, or other means to the legs of adjacent benches B at the sides of the front of the body, said steps being also formed with arms Q, which with the portions of the steps opposite the same form bifurcations, within which are located the working seats R, which form part of the thill or shaft coupling of the sleigh, and are mounted on the pivot S, whose bearings are on said steps and arms.

In the seats are vertical openings T, which receive studs U and V, which depend from the irons W on the lower ends of the shaft-terminals L, it being seen that when said studs are in position in the openings T and nuts X are applied to the studs U the shafts are firmly connected with the seats R and may freely oscillate with the movement of the animal and the sleigh, it being noticed that as the steps are connected with the legs of adjacent benches they act as braces for the latter. When the nuts are unscrewed, the shafts may be readily removed from the seats, as will be most apparent on inspection of Fig. 6.

Secured to the front of the body or the crown of the adjacent bench B, or both, is a screen, fender, or dashboard Y, which extends forwardly therefrom and has its front end adjacent to the lower portion of the screen, fender, or dashboard Z, which rises from and is secured to the shafts on or near the cross-bar J, it being noticed that the screen Z forms in a measure a continuity of the screen Y, thus providing efficient means for guarding the rider from snow, dirt, &c., thrown by the animal.

During the oscillation of the shafts the screen Z is permitted to ride freely over the front edge of the screen Y, thus avoiding injury to the screens, while, however, preserving the double guarding nature of both parts.

The fronts Y' of the runners are formed of metal, their lower portions joining the shoes and runners proper, as at Z, the upper ends of said fronts being connected with the crown or top cross-bar of the front bench B², it being noticed that as the front benches are braced by the steps of the sleigh and the knees of the runners are deflected toward the crowns of the front bench and firmly secured thereto a strong structure is produced, while the same is light and inexpensive. The benches B B' B² are formed of wood B³, clad with steel or iron B⁴, as in Figs. 9, 10, and 11. By these means the supports of the body are light, strong, and durable.

Having thus described my invention, what I claim as new, and desire to secure by Letters Patent, is—

1. A sleigh having arch-shaped benches which are connected with the body of the sleigh, diverging branches which are attached to said benches, and a step connecting adjacent benches and provided with a seat for coupling the shaft or tongue of the sleigh to said benches.

2. In a sleigh, a step connected with the benches thereof and a rocking seat mounted on said step and provided with means for coupling a shaft thereto, substantially as described.

3. A sleigh provided with a step which is connected with the benches thereof and forms bearings for the shaft of the sleigh, substantially as described.

4. A sleigh having a step, a rocking seat mounted on said step and having openings therein, and the shaft provided with studs, which enter said openings and are secured thereto, substantially as described.

5. A sleigh having an arch-like bench connected with the front of the body thereof, runners having their front ends of wood and secured to the crown of said bench, diverging braces connected with the legs of said bench and said runner, and an adjacent bench having its legs connected with said first bench by a step, one of said diverging braces having its lower end adjacent to the connection of the front end and the shoe of the runner.

6. In a sleigh, the shafts having their rear cross-bars extending laterally beyond the forward portion of said shafts and outside of the runners as at K, and continued rearwardly and curving downwardly as at L with the coupling devices on the latter, in combination with braces which are connected with the front end of said portions L and the sides of the portions H of said shafts and extending obliquely, the front part of the runners being within the space between said portions H and L and guarded by said braces N.

7. A sleigh provided with a plurality of separate screens, one rising from the front of the body of the sleigh, and the other rising from the cross-bar at the rear of the shafts, and forming a closed angle one with the other, the screen on the body being stationary and the screen on the shafts oscillating with the same in front of said stationary screen.

JAMES H. CAFFREY.

Witnesses:
JOHN A. WIEDERSHEIM,
R. H. GRAESER.